UNITED STATES PATENT OFFICE.

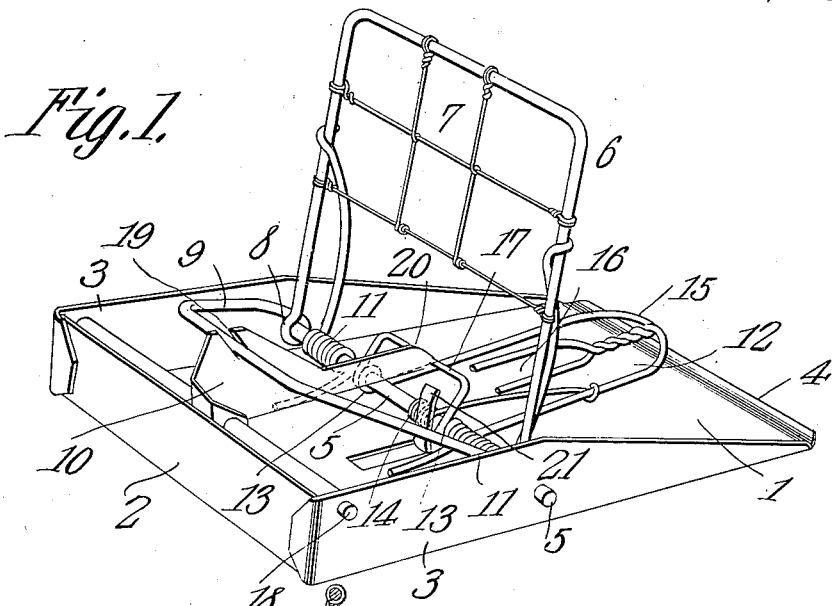
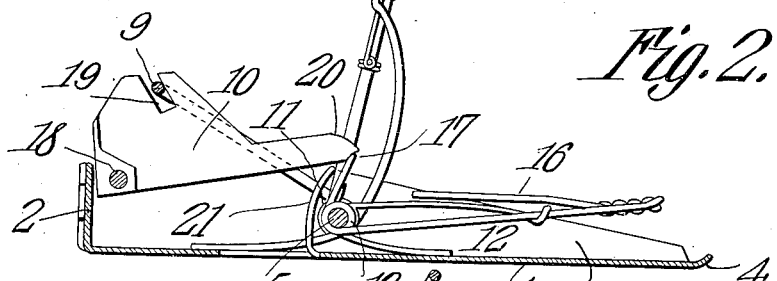
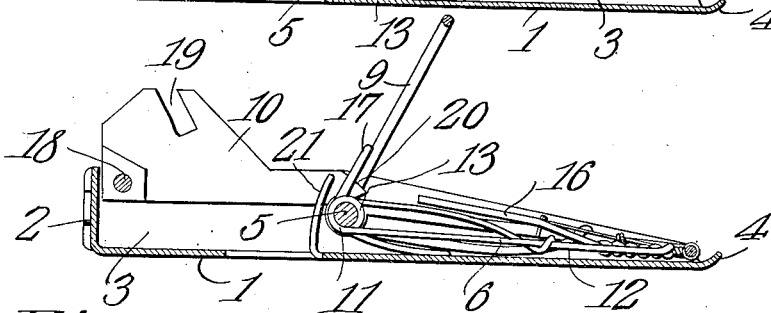

HENRY H. MAY, OF NEW ALBIN, IOWA.

ANIMAL-TRAP.

No. 907,516.  Specification of Letters Patent.  Patented Dec. 22, 1908.

Application filed September 2, 1908. Serial No. 451,374.

*To all whom it may concern:*

Be it known that I, HENRY H. MAY, a citizen of the United States, residing at New Albin, in the county of Allamakee and State of Iowa, have invented a new and useful Animal-Trap, of which the following is a specification.

This invention relates to animal traps, and has for its object to provide a spring trap for the capture of small animals, such as rats, mice and the like, a trap which shall be strong and consist of few parts which may be easily manufactured and assembled at small cost.

With this and other objects in view, the invention consists of the novel construction, combination and arrangement of parts hereinafter described and claimed and illustrated in the accompanying drawing, in which:—

Figure 1 is a perspective view of the trap in set position; Fig. 2 a longitudinal sectional view of the same, and Fig. 3 a like view of the trap after it has been tripped.

Like reference characters are used for the same parts in all the figures.

In the drawing, 1 indicates the base which in this instance is made of sheet metal in the form of a pan, having a vertical rear wall 2 and side walls 3, the upper edges of the latter walls tapering downwardly towards the front edge of the pan which is turned up slightly as shown at 4.

About midway the length of the pan is a transverse pin 5 projecting through the side walls thereof and secured against removal by riveting or upsetting its ends. Pivotally mounted on the pin 5 is a movable jaw 6, here shown as made of wire, rectangular in form with its parallel sides near the side walls of the base 1 and its free end adapted to rest, when the trap is sprung, in the turned up front 4 of the base. Extending across the jaw 6 between the sides and end thereof and rearwardly as far as necessary is a net-work 7 of wires fastened to said jaw which serve to prevent the escape of small animals such as mice caught in traps made for larger animals. The sides of the jaw when made of wire are bent to form eyes 8, one on each side, that rock on the pin 5. After forming the eyes 8 said wire is fashioned into a loop 9 disposed in a plane at about a right angle to the plane of the jaw 6 and adapted to engage a trigger 10 for holding the jaw open. One or more wire coil springs 11 with projecting ends, surround the pin 5, one of said ends bearing on the base 1 and the other end on the jaw 6 for quickly closing the same when the trigger 10 is tripped.

A bait support 12 is suspended between the base 1 and the jaw 6, by eyes 13 from the pin 5 and is capable of rocking thereon, an upward tendency being imparted thereto by a wire coil spring 14 on the pin 5, its ends bearing respectively on the base and on the under side of said bait support. The bait support 12 is shown as made of a loop 15 of wire, narrower and shorter than the jaw 6 and provided with fingers 16 reaching rearwardly from the front end on which fingers the bait is placed. A trip loop 17 forming a part of the bait support extends upwardly from the eyes 13 on which the forward end of the trigger bears when the trap is set.

The trigger 10 is pivotally mounted on a transverse pin 18 or other suitable means at the rear of the base and projects forwardly sufficiently far to bear on the trip loop 17 when set. At the top of the trigger near the pivot is a notch 19 to receive and hold the jaw loop 9 when the trap is set. The forward end of the trigger is beveled or curved at 20 so that it may ride past the trip loop 17 and permit the automatic setting of the trap. A stop 21 on the base in rear of the pin 5 is provided against which the trip loop bears when the trap is set to prevent the bait support rising too high under the influence of the spring 14.

Assuming the trap to be sprung as represented in Fig. 3, it is set by pressing the jaw loop 9 rearwardly until it engages the notch 19 in the trigger. The bait support, which had been depressed by the jaw rises as soon as the jaw is elevated to its highest point, thereby moving the trip loop over the beveled or curved forward end of the trigger. The entrance of the jaw loop into the notch 9 raises the forward end of the trigger, and its beveled end striking the trip loop, pushes it forward until the trigger end escapes past said trip loop, the latter then springs beneath the trigger and holds it elevated so that the jaw loop is retained in the notch 9 which is inclined at such an angle as to lock the jaw loop and hold the jaw elevated or set. The moment the bait support is depressed slightly, the trigger loop is withdrawn from the trigger, releasing it and permitting the jaw to drop quickly under the influence of the spring or springs 11.

What is claimed is:—

1. A trap comprising a base, a spring-actuated jaw mounted to swing upon the base, a loop integral with said jaw and disposed at an angle thereto, a trigger pivotally mounted at one end upon the base and provided between its ends with a loop-receiving notch, a spring-controlled bait support mounted on the base, a loop integral therewith and disposed at an angle thereto, for supporting the trigger in engagement with the loop of the jaw, and a stop device integral with the base for limiting the movement of the loop of the bait support.

2. A trap comprising a base, a spring-controlled jaw movably mounted thereon, a trigger for holding the jaw set, and a bait-support for locking the trigger, said support comprising a single length of wire bent to form oppositely disposed pivot-receiving eyes, there being an intermediate loop between the eyes, the end portions of the wire being directed inwardly toward the loop and twisted together, the terminals of the wire being spaced apart to constitute a bait-engaging fork, said fork and twisted portion being disposed in the same plane with the adjoining portions of the support.

In testimony that I claim the foregoing as my own, I have hereto affixed my signature in the presence of two witnesses.

HENRY H. MAY.

Witnesses:
 OSCAR C. TANTT,
 W. O. BOCK.